Nov. 14, 1933.  R. L. MULLER  1,935,274
AUTOMATIC CHECK WRITING AND NUMBERING MACHINE
Filed Nov. 23, 1928  8 Sheets-Sheet 1

Fig. 1

INVENTOR
Robert L. Muller
BY
Rector, Hibben, Davis, & Macauley
ATTORNEYS

Fig. 3

Nov. 14, 1933. R. L. MULLER 1,935,274
AUTOMATIC CHECK WRITING AND NUMBERING MACHINE
Filed Nov. 23, 1928   8 Sheets-Sheet 5

Fig. 8

INVENTOR
Robert L. Muller
BY
Rector, Hibben, Davis, & Macauley
ATTORNEYS

Nov. 14, 1933.   R. L. MULLER   1,935,274

AUTOMATIC CHECK WRITING AND NUMBERING MACHINE

Filed Nov. 23, 1928   8 Sheets-Sheet 8

Fig. 11

INVENTOR
Robert L. Muller
BY
Rector, Hibben, Davis & Macauley
ATTORNEYS

Patented Nov. 14, 1933

1,935,274

UNITED STATES PATENT OFFICE 1,935,274

AUTOMATIC CHECK-WRITING AND NUMBERING MACHINE

Robert L. Muller, Detroit, Mich., assignor to Burroughs Adding Machine Company, Detroit, Mich., a corporation of Michigan Application November 23, 1928
Serial No. 321,349

30 Claims. (Cl. 101—93)

This invention relates to an automatic checkwriting and numbering machine. It comprehends a machine that will automatically write and consecutively number checks, keep a separate record of the dates, the amounts and the numbers of the checks, and accumulate and print, when desired, the total of the checks written.

Business institutions of today issue enormous numbers of checks of various kinds such as pay checks, checks for supplies and services, and checks for all the miscellaneous expenses that are associated with the many ramifications of a modern business. This condition makes it necessary to have some way of issuing checks rapidly, accurately, and inexpensively and, at the same time, to have an accurate record of them which may be easily examined for tracing down any particular check and proving the accuracy of the work done. The present invention comprehends an automatic machine for this purpose which, after the date is set in the machine, merely requires that the operator insert the amount of each check and press a bar to start the machine, after which not only the date and the amount will be inserted in the check but each check will be consecutively numbered and the number, date and amount will be printed on a journal or other record sheet. At the same time the amounts of the checks will be accumulated and a total may be taken at any desired time. If required, different groups of checks may be separately accumulated in the machine at the same time so that, at the end of a day's work, the different groups of checks may be totaled and a grand total may be obtained.

The object of the invention is to provide an improved automatic check-writing machine.

Another object is to provide an improved machine for automatically and consecutively numbering checks, folio sheets, or the entries made on any other type of work sheets, the invention also comprehending the consecutive printing of characters or words as well as of numbers.

Other objects and advantages of the invention will appear from the following specification and drawings.

An embodiment of the invention is shown in the accompanying drawings in which.

The invention is illustrated in connection with a Burroughs accounting machine, the general features of which are well known and will be described only briefly. Although the embodimentn illustrated is particularly adapted for use with this machine, it will be understood that the invention may be also used with other machines of similar character.

General construction of machine

Figure 2:
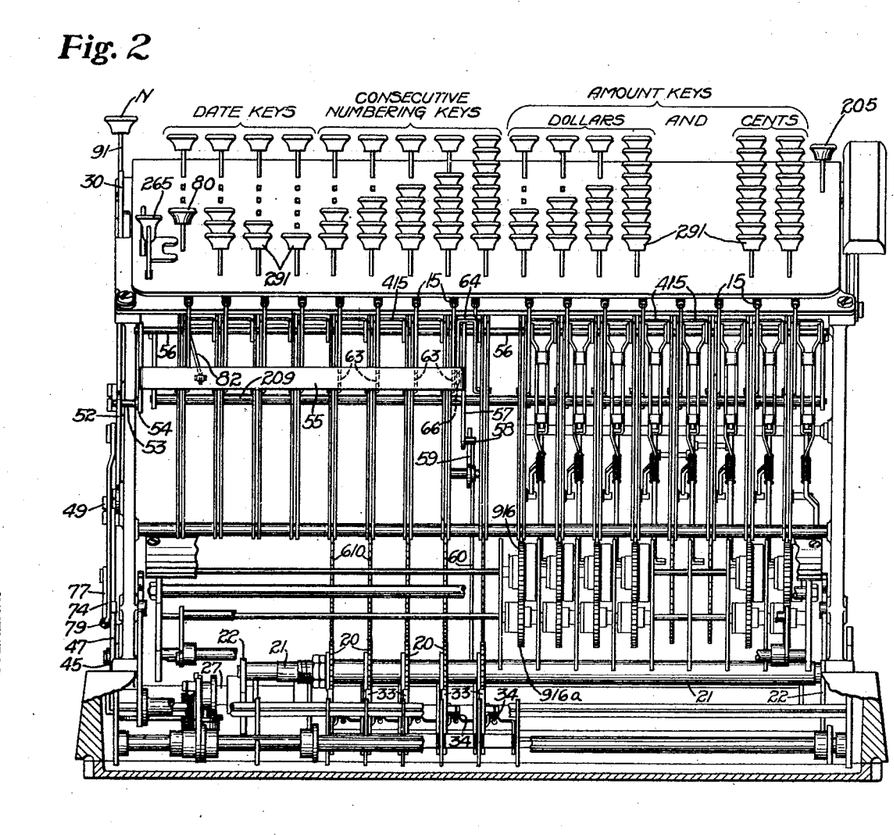
Fig. 2 is a front elevation of the machine with the casing removed, some of the parts being broken away.

The machine is provided with a plurality of banks of amount keys 291 which are best illustrated in Fig. 2. Although the number and arrangement of these banks may be varied, a suitable arrangement has been found to be to use the first eight banks on the right for the entry of the amounts of the checks, the next five banks to the left for the consecutive numbering, and the last four banks for the dates. The third and fourth banks of keys in the amount section are preferably omitted so that the word "and" may be printed, in which event the first two columns on the right of the amount section are used for cents and the four left columns are used for dollars.

Figure 1:
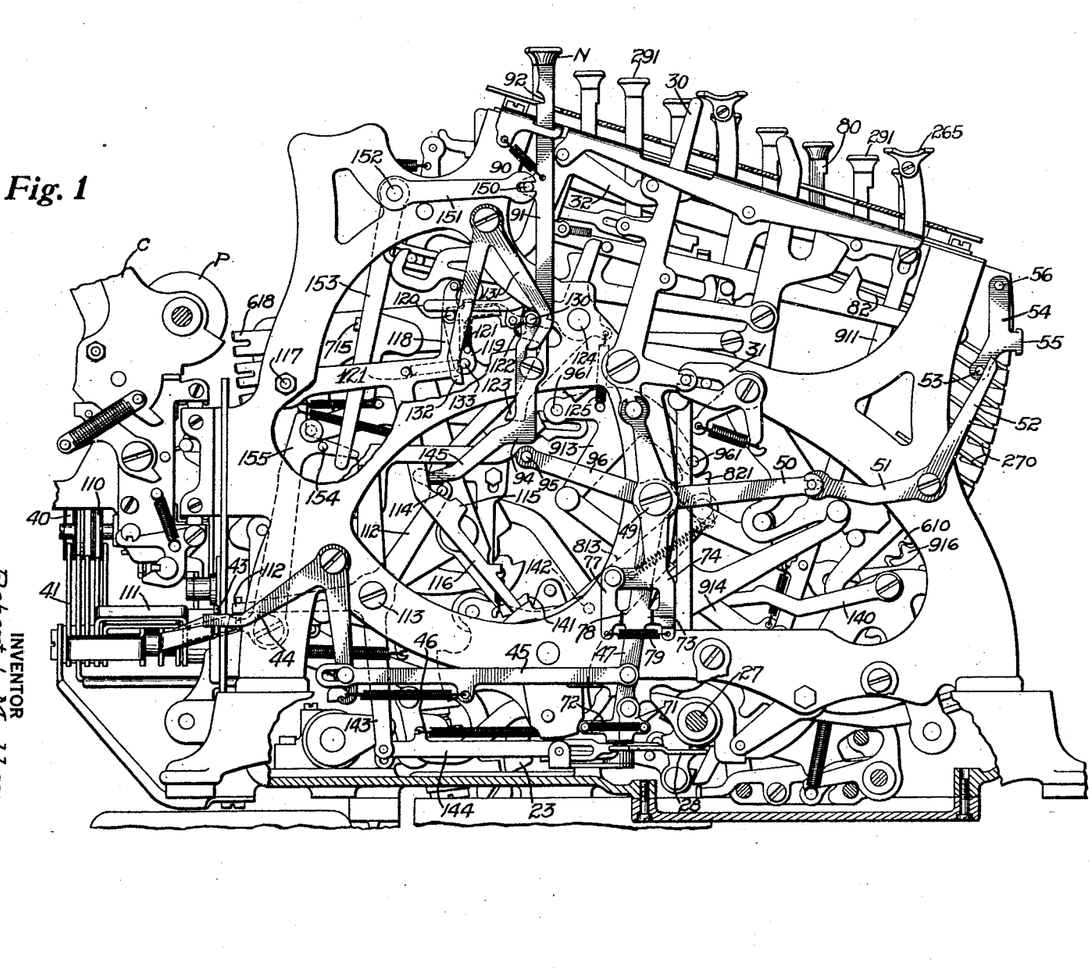
Figure 1 is a side elevation of the machine with the casing removed, the parts being in normal condition and some of them being broken away to show others more clearly.
Figure 3:
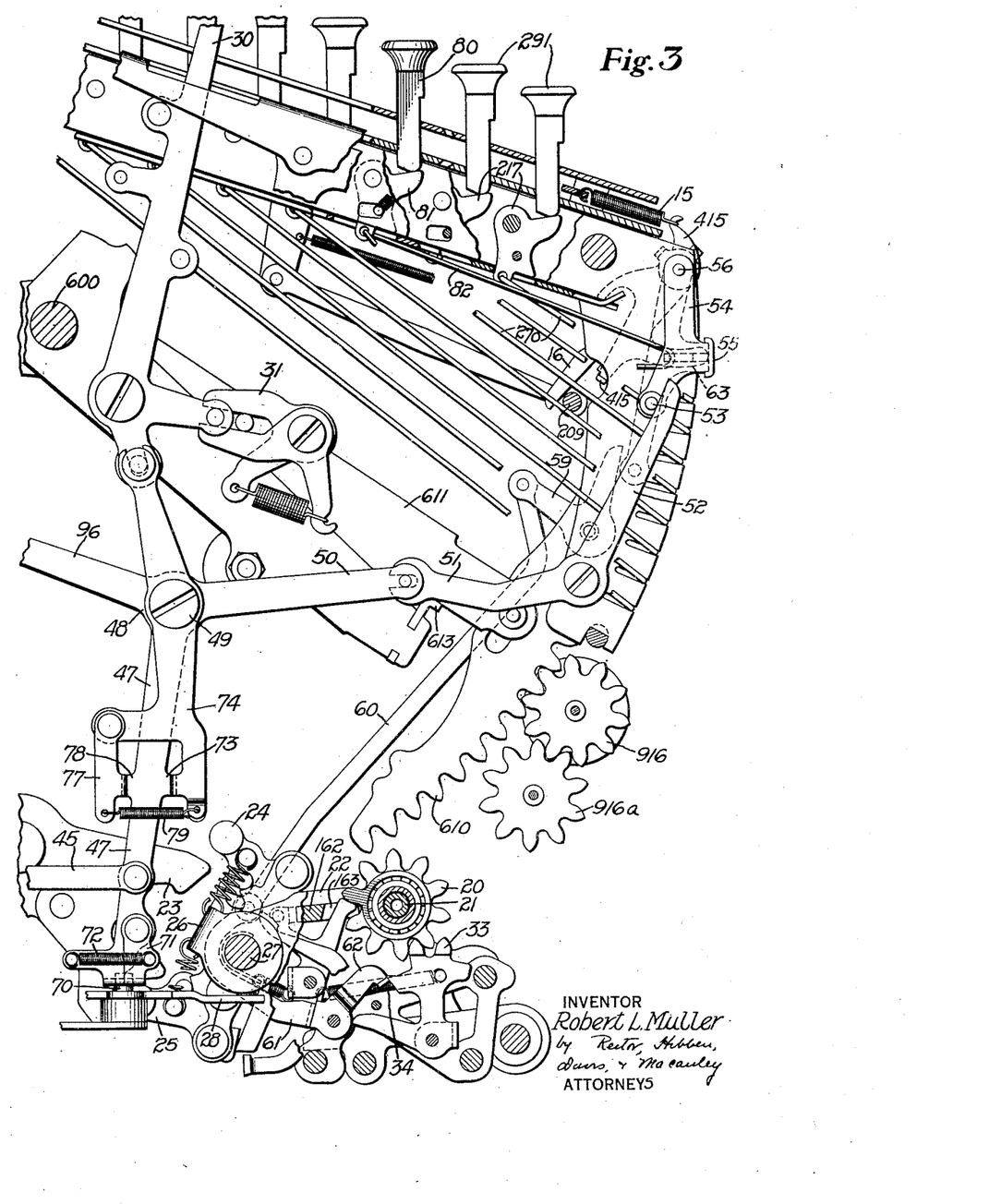
Fig. 3 is an enlarged sectional side elevation of the front part of the machine with the parts in normal condition, some of the parts being broken away to illustrate others more clearly.

Each amount key, when depressed, rocks a detent 217 (Fig. 3) to which is connected a stop wire 270 that acts to differentially position an actuator rack 610 for the bank in which the depressed key is located. Each actuator rack is normally held elevated by a latch 415 urged counter-clockwise by a spring 15 but, when one of the amount keys in a bank is depressed, a sliding plate 214 for that bank is moved rearwardly, the plate having an upstanding projection at its forward end which releases the latch 415 to release the actuator rack 610. The actuator racks are carried by arms 611 pivoted on the shaft 600 and, at their rear ends, they carry type bars 618 which are positioned relative to a platen P on a traveling paper carriage C at the same time that the actuator racks are positioned. The type bars are driven into engagement with the paper carried about the platen by means of hammers 715 that are operated by a printing mechanism only parts of which are shown in Fig. 1, said mechanism being described in Burroughs Patent No. 505,078. The arms 611 are held elevated by a bail 613 which, as the machine is operated, moves clockwise from the position of Fig. 3 to permit the actuator racks 610 to descend to differential positions determined by the stop wires 270. Upon the return stroke of the machine the bail picks up all the arms 611 and returns the actuator racks to normal position.

Associated with the actuator racks 610 is a counter comprising counter pinions 916 with which is associated a second set of pinions 916ª. The counter is rocked into and out of engagement with the racks at appropriate times by a pitman 914 (Fig. 1) connected to one arm of a three-armed lever 913. The three-armed lever 913 has studs 961 on its other two arms which are engaged by a pass-by pawl 821 carried by a lever 813 that is rocked counter-clockwise during the forward stroke of the machine and returned clockwise during the return stroke. The general operation of these parts is well known in the art so they will not be further described.

In performing addition the actuator racks 610 are allowed to descend to their differential positions after which the counter 916 is rocked into engagement with the racks so that, as the latter are returned to normal, the counter pinions are rotated distances corresponding to the distances through which the racks are moved in being returned to normal.

In taking a total the counter pinions are rocked into engagement with the actuator racks prior to the descent of the latter and the racks are then allowed to descend to positions which are determined by the counter pinions themselves, said pinions having projections on them that arrest them in their zero position. The actuator racks as well as the arms 611 with the types 618 are thereby differentially positioned by the counter pinions so that, when the printing mechanism operates, it will print the amount of the total, after which the counter pinions are disengaged from the racks while in zero position and the racks returned to normal. In order to release the racks 610 in the taking of a total and in order to condition the controls to properly time the rocking of the counter into and out of engagement with the racks to take a total, a total key 265 is provided, which, when depressed, moves a bail 209 (Fig. 3) rearwardly. This bail contacts the tails 16 of the latches 415 and releases all of them so that the actuator racks are free to descend when the bail 613 moves downwardly. Depression of the key 265 also moves a link 911 (Fig. 1) downward, said link being connected to the pitman 914 so as to position it to time the rocking of the counter 916 into engagement with the racks for total taking.

Figure 9:
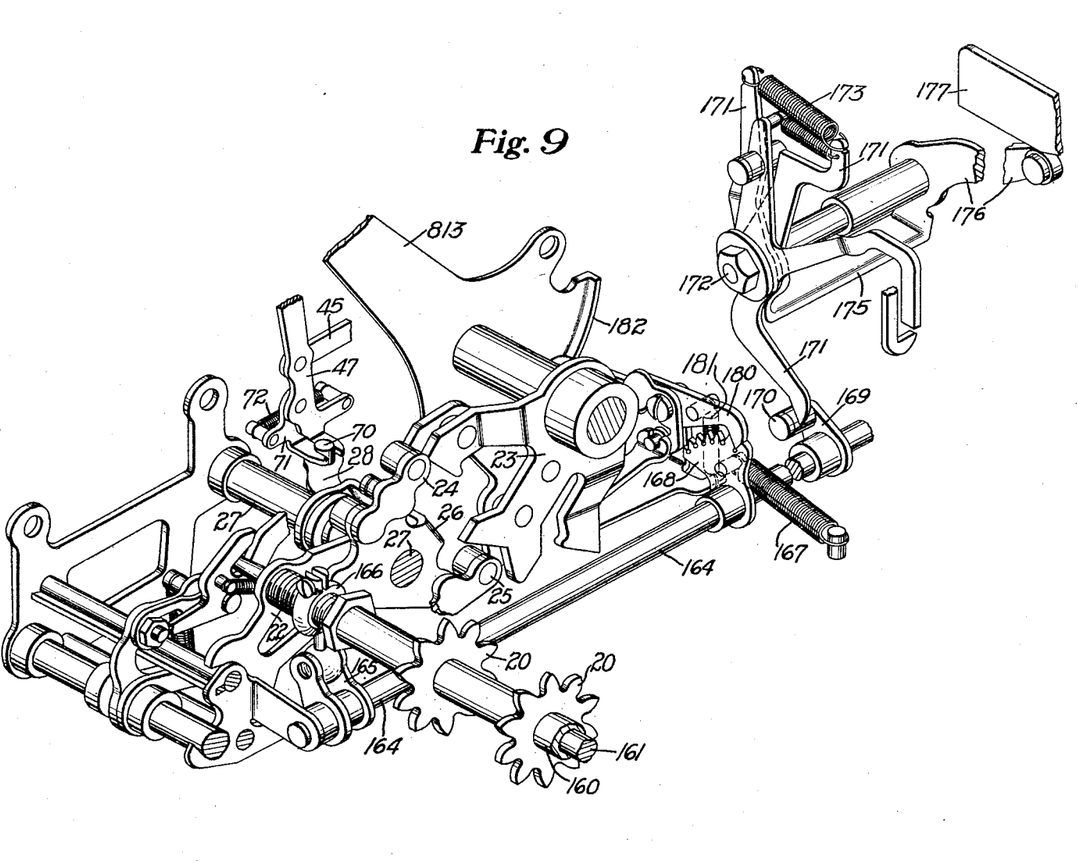
Fig. 9 is a perspective view of the multiple counters and controls therefor that may be associated with the machine.
Figure 10:
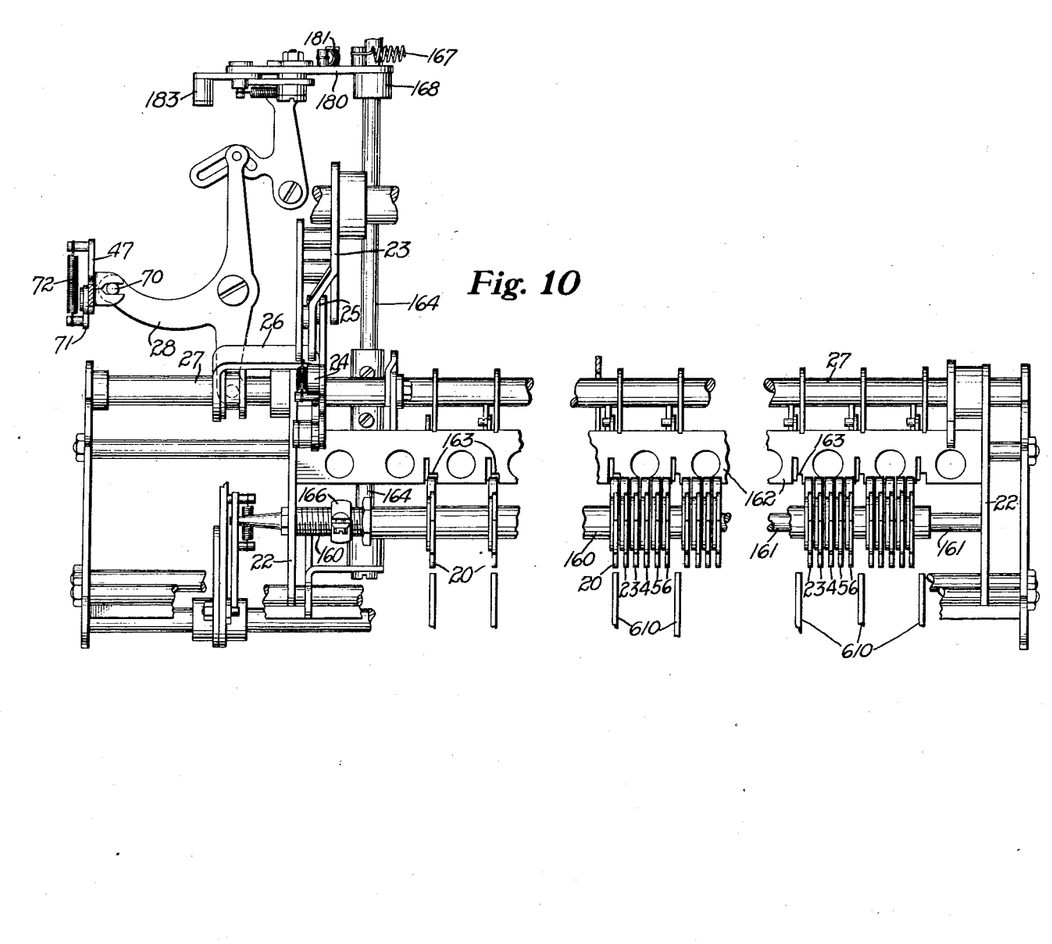
Fig. 10 is a fragmentary sectional plan view of the multiple counters and the controls therefor.

A consecutive numbering mechanism is also associated with the actuator racks 610, said mechanism including a plurality of pinions 20 (Fig. 3) mounted on a shaft 21 carried by a frame 22 which is rocked to move the pinions into and out of engagement with the actuator racks by means of a cam 23 illustrated in detail in Figs. 9 and 10. This cam has various cam surfaces for striking pass-by pawls 24 and 25 carried by a yoke 26 which is slidable on a shaft 27, said yoke being connected with the counter frame 22 so as to rock it. By sliding the yoke 26 along the shaft 27 the pass-by pawls 24 and 25 may be positioned for engagement by different cam surfaces of the cam 23 so as to vary the time at which the pinions 20 will be rocked into and out of engagement with the actuator racks. The yoke 26 is moved from one position to another by means of a bell crank lever 28 (Fig. 10), which is operated by a control lever 30 best illustrated in Fig. 4, through connections which will be later described. When the lever 30 is pulled forwardly to the position marked "T" the bell crank lever 28 is moved so as to position the sliding yoke 26 for the taking of a total. When the lever 30 is moved rearwardly to the "S.T." position the sliding yoke 26 is moved to proper position for the taking of a sub-total. The control lever 30 is urged to a normal central position by a scissors mechanism 31, in which position of the lever the sliding yoke 26 is positioned to cause addition to occur on the counter 20. At each operation of the machine, the control lever 30 is latched in position by a latch 32 (Fig. 1) which is locked through connections which are not shown in detail, but which are described along with the other details of the controls for the pinions 20 in Pasinski Patent 1,778,506, October 14, 1930.

The pinions 20 are provided with a transfer mechanism including a plurality of transfer segments 33 urged in a counter-clockwise direction by springs 34. An understanding of the details of this transfer mechanism is not necessary for an understanding of the present invention, said transfer mechanism being described in detail in Pasinski Patent 1,774,289, August 26, 1930.

The paper carriage C is automatically tabulated from right to left as viewed from the front during operation of the machine and automatically returned to the right by a carriage return mechanism of the type illustrated in Rinsche Patent No. 1,580,534, April 13, 1926, and Trew Patent No. 1,723,668 dated August 6, 1929. The machine is also provided with an automatic repeat mechanism of the type illustrated in Muller Patent No. 1,397,774, which, when the starting bar is depressed in a predetermined columnar position of the carriage, causes the machine to be operated automatically for a predetermined number of times. During this operation the carriage will be tabulated to certain columnar positions, it will be returned across the machine and the machine will be operated in each column in accordance with a predetermined setting.

The above features of the machine having been briefly explained, the consecutive numbering mechanism will be described.

*Consecutive numbering mechanism*

The consecutive numbering mechanism is associated with the five banks of keys between the date keys and the amount keys as illustrated in Fig. 2. The keys, the stop wires 270, the actuator racks 610, and the counter associated with the actuator racks are of the same general type as those heretofore described but with certain modifications as will later appear.

Figures 4, 5, 6, 7:
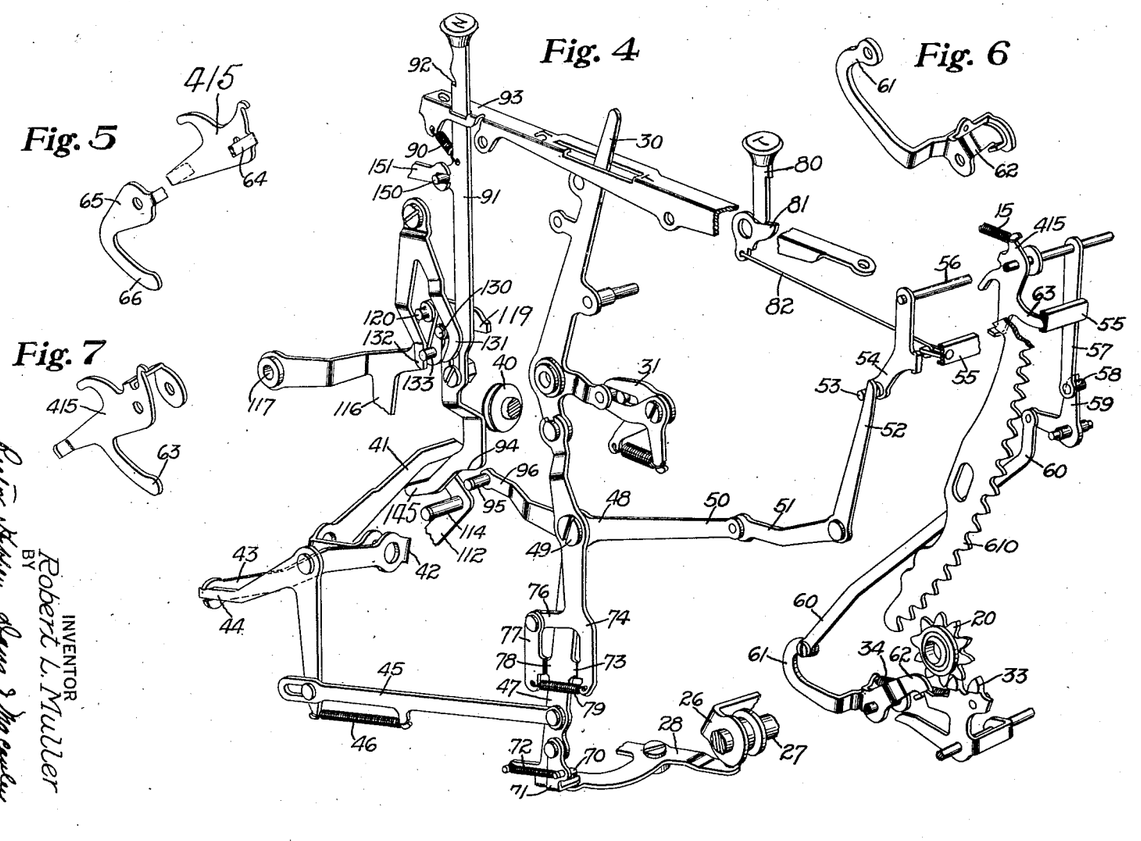
Fig. 4 is a sectionalized perspective view of the parts of the machine particularly concerned with the consecutive numbering mechanism.
Fig. 5 is an extended perspective view of one of the latches associated with the consecutive numbering mechanism.
Fig. 6 is an extended perspective of one of the carrying detents of the transfer mechanism which is modified in connection with the consecutive numbering mechanism.
Fig. 7 is a perspective view of one of another set of latches associated with the consecutive numbering mechanism.
Figure 8:
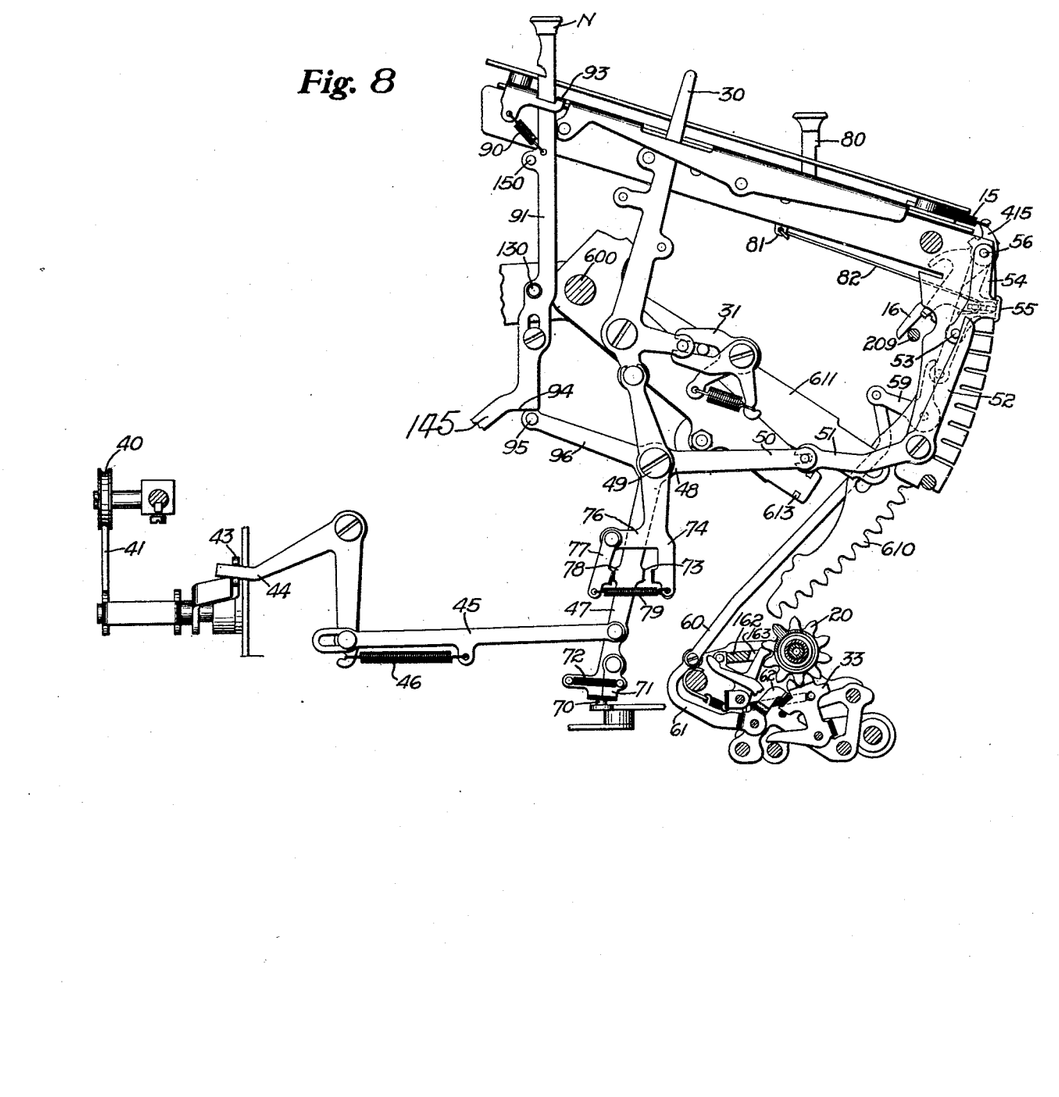
Fig. 8 is a sectional side elevation of the forward part of the machine showing particularly the consecutive numbering mechanism, the parts being shown in the positions they occupy after they have been operated to add one to the number that is already in the machine.

The consecutive numbering mechanism is controlled by the paper carriage and, for this purpose, the carriage is equipped with a control roller 40 (Fig. 8) adapted, in a predetermined columnar position of the carriage, to depress an arm 41 of a pivoted yoke 42 having a second arm 43 provided with a bifurcated end engaging one arm of a bell crank lever 44 whose other arm has a pin and slot connection with a link 45, the pin being urged toward the forward end of the slot in the link by a spring 46. The forward end of the link 45 is connected to one arm 47 of a three-armed lever 48 pivoted at 49. The forward arm 50 of this three-armed lever is connected to one arm 51 of a bell crank lever whose other arm 52 engages a stud 53 on the side arm 54 of a yoke 55 pivoted on the cross rod 56 at the forward part of the machine. The other arm 57 of the yoke 55 extends downwardly and carries a stud 58 engaging one arm of a bell crank lever 59 whose other arm is connected to a downwardly extending link 60 that is pivotally connected to an extension 61 of a detent 62 which controls the transfer segment 33 for the pinion 20 of lowest order in the five banks used for consecutive numbering. The detent 62 is specially constructed as illustrated in Fig. 6. By reference to Fig. 2 it will be observed that there are no pinions to either the right or left of the five pinions in the consecutive numbering banks. The pinions 20 thus constitute an independent consecutive numbering counter.

From the description thus far given it will be apparent that, when the carriage reaches the column that has been chosen for consecutive numbering, the roller 40 will rock the yoke 42 clockwise which will result in the clockwise movement of the bell crank lever 44 and the rearward movement of the link 45. This will rock the three-armed lever 48 clockwise and the bell crank 51—52 will be moved counter-clockwise to rock the yoke 55 clockwise. This will move the bell crank lever 59 counter-clockwise and lower the link 60 which, in turn, will rock the detent 62 upwardly to release the transfer segment 33 which will move one step rearwardly under the influence of its spring 34. In this manner, when the carriage reaches a predetermined columnar position, the pinion of lowest order in the consecutive numbering section will be advanced one step or unit of movement. After the pinion of lowest order has been advanced nine steps, a carry will take place when the pinion is next moved said carry serving to advance the pinion of next highest order one step. There is a carrying mechanism between each of the pinions so that, at the appropriate time, carrys will take place to correctly register the total, the capacity of the counter being 99999.

It will be readily appreciated that the connections for advanacing the pinion 20 of lowest order one step at a time could be associated with the pinion of any other order in the consecutive numbering bank, in which event the counter in this section would be advanced by tens or by hundreds, etc. In such event the pinions to the right of the pinion advanced could be omitted, the printing of zeros to the right being taken care of by the overlapping tails of the firing hammers of the printing mechanism.

In order to print the consecutive numbers appearing in the consecutive numbering counter, it is necessary to index the printing mechanism in accordance with the number appearing in the counter and this must be done without removing the number from the counter because the next unit should be added to what has already been registered.

In order to index the printing mechanism, use is made of the actuator racks 610 which, as previously described, are carried by arms 611 having type bars on their rear ends. The keys are not used in the consecutive numbering banks except for setting up an initial number as will be later described and hence the actuator racks in the consecutive numbering banks are not normally released as far as release by depression of keys is concerned. In order to release these racks the latches 415 of the consecutive numbering banks are provided with forwardly extending projections 63, which are positioned for engagement by the cross-member of the yoke 55. The cross bar 55 extends in front of four of the banks of the consecutive numbering section and in front of all of the banks of the date section, but the latches 415 of the date section are not provided with extensions 63 so that movement of the yoke does not release the latches in the date section. Although the yoke does not extend in front of the latch for the first bank of the consecutive numbering sections, provision is made for releasing the latch 415 of the first bank in that said latch is provided with a lateral extension 64 illustrated in Fig. 5 in the nature of a yoke connected to an arm 65 having a forward extension 66 positioned to be contacted by the yoke 55.

When the carriage reaches the columnar position for consecutive numbering, and the yoke 55 is rocked clockwise in the manner previously explained, all of the latches 415 will be rocked rearwardly to release the racks 610 in the banks used for consecutive numbering. This will permit the racks to descend as the bail 613 moves downwardly. It will be observed that the latches 415 in the consecutive numbering banks are not provided with the usual tails 16 such as illustrated for the standard latches in Fig. 3 and by means of which the standard 415 latches are released by the total key 265 and consequently, when the total key 265 is depressed to take a total, the latches 415 in the consecutive numbering bank will not be released and the taking of a total will not disturb the consecutive numbering section.

In order to index the actuator racks by means of the consecutive numbering pinions 20, it is necessary to move the pinions into engagement with the racks before the racks descend. Normally, the pinions are not rocked into engagement with the racks until after they have descended because the controls are normally conditioned for addition as previously explained. This makes it necessary to provide some means for automatically conditioning the machine to cause the pinions 20 to be rocked into engagement with the actuator racks 610 prior to the descent of the latter. Such mechanism has been provided in connection with the arm 47 of the three-arm lever 48 which is moved by the roller 40 on the paper carriage.

The lower end of the arm 47 has a yielding connection with the bell crank lever 28 that controls the position of the sliding yoke 26 that determines when the counter 20 shall be rocked into and out of engagement with the racks 610. The lower end of the arm 47 is bent laterally and positioned to engage one side of a stud 70 on bell crank 28 which stud is engaged on its other side by a pawl 71 pivoted on arm 47 and yieldingly held in position by a spring 72. When the carriage roller 40 engages the arm 41 and pulls the link 45 rearwardly, the arm 47 is pulled rearwardly which rocks the bell crank lever 28 to position the sliding yoke 26 so that the cam 23 will rock the pinions 20 into engagement with the actuator racks 610 prior to their descent. The condition of the parts is then such that the pinions 20 remain in engagement with the actuator racks both during their descent and ascent as in a sub-totaling operation, the pinions being rocked out of engagement with the racks at the end of the return stroke of the machine and after the racks have been restored to normal. The racks 610 are stopped by the pinions 20 when these pinions reach their "zero" positions and the racks with their arms 611 carrying the printed types 618 are thus arrested in differential position corresponding to the number appearing in the pinions. While they are in this position the printing mechanism operates to fire the hammers 715 to print the consecutive number. As the racks 610 are restored to normal, the pinions 20 are rotated back to their original position, after which they are rocked out of engagement with the racks and, as will be readily understood, the same number will appear in the pinions as was in it before the indexing operation took place.

In order to permit the setting of the controls for the pinions 20 as above described while the control lever 30 remains locked in neutral position and, in order to do this without interfering with the control of the pinions by the control lever 30, a special connection has been provided between the arm 47 and the control lever 30. The arm 47 is provided near its center with an abutment projection 73 engaged by one end of an arm 74 pivoted on the stud 49, the other end of the arm being bifurcated and straddling a stud 75 on the end of the pivoted control lever 30. The lower end of the arm 74 has a lateral projection 76 to which is pivoted a pawl 77 positioned to engage an abutment 78 on the arm 47, the pawl being urged counter-clockwise as viewed in Fig. 4 by means of a spring 79. When the link 45 is pulled rearwardly the arm 47 contacts the pawl 77 and the spring 79 yields, the parts moving to the position illustrated in Fig. 8. The arm 74 remains in position and the control lever 30 is not disturbed. With the parts in the position illustrated in Fig. 8, the spring 79 tends to restore the arm 47 to normal and such action occurs as soon as the carriage roller 40 passes beyond the arm 41. These connections do not interfere with the control of the bell crank 28 by the control arm 30 when the carriage roller 40 is ineffective. When the lever 30 is moved rearwardly toward sub-total position, the lever 74 is rocked clockwise and the arm 47 moves rearwardly, no opposition being interposed by the link 45 because rearward movement of the arm 47 tends to rock the yoke 42 clockwise to move the arm 41 downwardly away from the carriage roller 40. When the control lever 30 is pulled forward, the arm 74 is rocked counter-clockwise which moves the arm 47 forwardly. This tends to rock the yoke 42 counter-clockwise and to move the arm 41 upwardly. If under such conditions it should happen that the roller 40 is above the arm 41, the spring 79 will yield and there will be no control of the bell crank 28 by the lever 30. When there is no roll 40 above lever 41 the control lever 30 is effective in the usual manner.

It will be observed, by referring to Fig. 2, that no counter pinions 916 are provided in the banks employed for consecutive numbering. Likewise, no pinions 20 are provided in the eight right hand banks used for the entry of dollars and cents. The five pinions 20 thus constitute an exclusive consecutive numbering counter associated with the consecutive numbering banks. This avoids any complications that might arise by the transfer of numbers from one set of pinions to the other. For example, if there were counter pinions 916 for the consecutive numbering banks, a transfer might occur from one set of pinions to another when the machine was conditioned for certain operations such as the transfer of totals. Likewise, if lower pinions 20 were provided for the dollars and cents banks, the transfer might occur from the pinions 916 to the lower pinions 20 which would cause an error in the consecutive numbering. With the present construction no interference of this kind can take place, the dollars and cents pinions operating independently of the consecutive number pinions and vice versa.

It will also be noted that no pinions whatever are provided for the four banks on the left hand side of the machine which are used for entering dates as no pinions are necessary in these banks, the amount keys being used merely to index the printing segments to print the proper dates.

It is to be understood that while the mechanism has been described with special reference to its use for consecutive numbering, it may be also used for consecutively printing characters or other designating symbols or words such as the months of the year. One such use may be, for example, the recording of partial payments where payments are to be made each month. In such event the types 618 in the first column of the consecutive numbering section will be type that will print the months of the year as for example "Jan.", "Feb.", "Mch.", etc. There will be twelve of these types and there will be twelve teeth in the pinions 20 instead of ten. It will be obvious that, with this arrangement, when the carriage reaches its predetermined columnar position, the designation "Jan." will be printed the first time, "Feb." the second time, "Mch." the third time, etc. The carriage is generally not tabulated when being used for this work. Instead, the platen is line spaced to cause the consecutive months to appear after each other in one column.

Such a use as above described may be combined with consecutive numbering by using, for example, the fifth bank of the consecutive numbering section to print the month as above explained and then the first four sections may be used in consecutive numbering. For example, suppose that partial payments are to start with $10.00 a month and increase by $10.00 each month. The consecutive numbering controls can be associated with both the fifth and the fourth pinion from the right. When the carriage reaches its predetermined columnar position, the first setting will be "Jan." $10.00, the second setting will be "Feb." $20.00, the third "Mch." $30.00 and so on. In the event the payments in an example such as above described should decrease each month instead of increase, the reduction can be set up by the use of a device such as illustrated in Horton Patent No. 1,229,461. These combinations can, of course, be varied to suit requirements, the above being merely described as explanatory in order to make it clear that the mechanism may be used for a variety of purposes.

It is necessary to restore the transfer segment 33 which is tripped each time the consecutive numbering mechanism is operated, and it is also necessary to restore any of the other transfer segments associated with the pinions 20 which may have been tripped during a consecutive numbering operation. The transfer mechanism is provided with a restoring bail which is rocked upwardly during a portion of an operation of the machine to restore the segments during the time that the counter is out of engagement with them. It is not necessary to understand the details of this mechanism as the same is described in the patent referred to on the transfer mechanism, but it should be mentioned that the mechanism is such that, when the sliding yoke 26 is positioned to cause the pinions 20 to be rocked into engagement with the actuator racks 610 before the latter descend and to maintain them in engagement with the racks until they are restored to normal, which corresponds to a sub-totaling operation in a standard machine, the connections for the restoring bail are disabled. Accordingly, when the roller 40 is in engagement with the arm 41 the restoring bail is not operated to restore the transfer segments which makes it necessary to provide some means for insuring that the transfer segments are restored. When the machine is being used for check writing no difficulty is experienced in this connection because, after the machine has been operated in the column where the roller 40 depresses the arm 41, the carriage moves on to another column and the arm 41 is freed so that, in the next operation of the machine which is an adding or normal operation, the transfer segments are restored.

It may be desirable, however, to use the consecutive numbering feature in connection with a series of operations in one column of a folio or work sheet. In such event the carriage can, as far as the printing is concerned, remain in one columnar position. Line spacing the platen to make each entry appear below the other in the same column is sufficient for printing. However, if the carriage is not tabulated, the roller 40 remains in engagement with the arm 41 and the transfer segments will not be restored when the machine is operated. The result is that the consecutive numbering feature does not operate properly.

In order to restore the transfer segments it has been found that one of the simplest expedients is to move the carriage to an adjoining column where the roller 40 is not effective and to give it a stroke of operation in said column to restore the transfer segments. This can be done by hand, which, however, is not a very rapid expedient. Preferably, it is done by means of a shuttle mechanism such as described in White Patent No. 1,048,249, December 24, 1912, or by adjusting the carriage return mechanism of Rinsche Patent No. 1,580,534 and the repeat mechanism of Muller No. 1,397,774 so that the carriage merely shuttles back and forth between two columns. This does not require any extra operation on the part of the operator because he merely depresses the starting bar which causes the machine to be given a stroke of operation in the desired column and automatically shifts the carriage to an adjoining column where the machine is given a stroke to restore the transfer mechanism, after which the carriage is shifted back to its original positions, all these operations taking place automatically.

Automatic check writing

Figure 11:
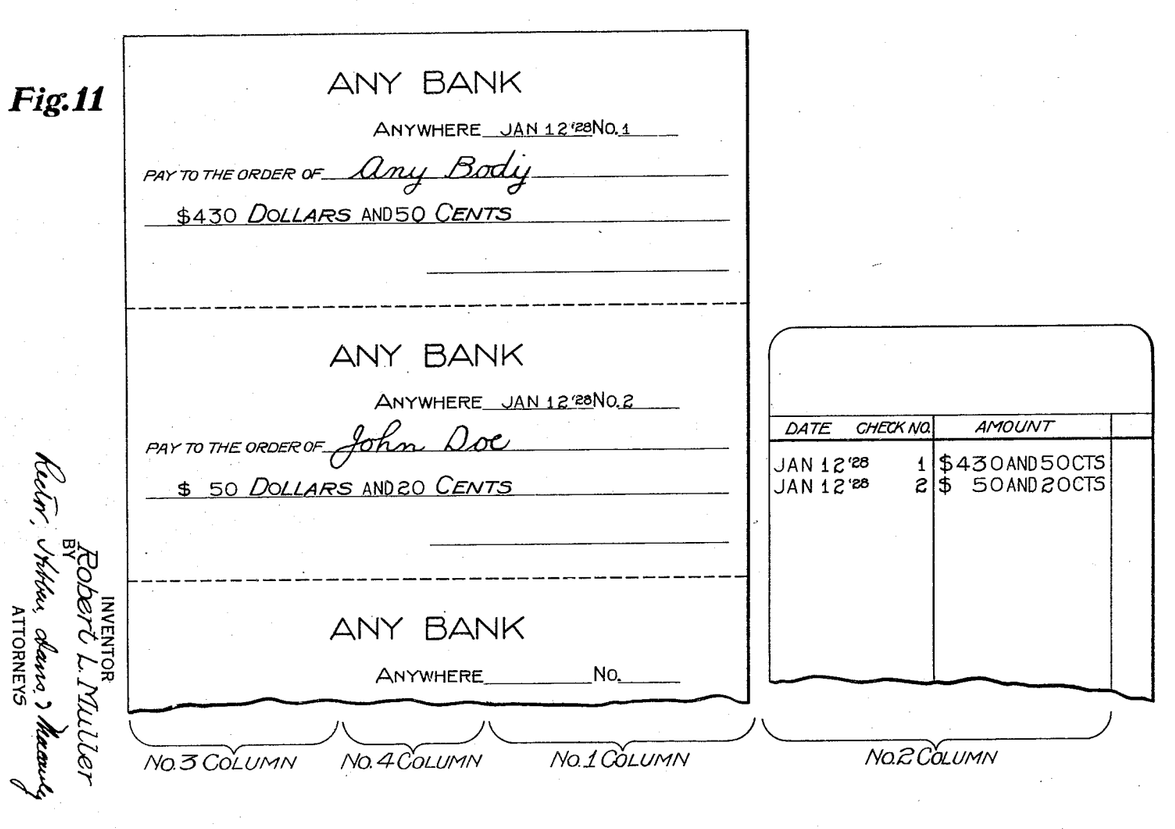
Fig. 11 illustrates the check forms and the journal sheet used in the machine, the view illustrating how the checks are written and the data recorded on the journal sheet.

The blank checks used come in strips with certain printed or engraved matter on them such as illustrated for the checks on the left hand side of Fig. 11. These checks together with a journal sheet, illustrated in Fig. 11, are placed in the paper carriage and around the platen.

Assume that the machine has been cleared, and that the carriage is moved to the starting position which is marked "No. 1 column" in Fig. 11. As the machine reaches this position the roller 40 contacts the arm 41 and the consecutive numbering counter 20 is advanced one unit. Assuming that this is the first check to be written for the day, the date is entered in the date column, for example, "Jun." 12 '28. This date need not be entered for subsequent checks because the keys are held down until released at the end of the work requiring this date to be entered.

After the date is entered the amount of the check in dollars and cents is entered in the dollars and cents columns after which the starting bar is depressed and the machine performs the rest of the operations automatically.

The first thing that happens is that the machine is given a stroke of operation in the starting or "No. 1" column. The date and the number of the check are printed in the upper right hand corner as illustrated in the top check of the Fig. 11 "Jan. 12 '28 (No.) 1." The dollars and cents are not printed in this column, the hammers of the printing mechanism of the amount section being automatically blocked by a mechanism of the type illustrated in the Gascon Patent No. 1,395,991 which is set by the carriage. The dollars and cents are not added into counter 916 in this column, the controls for said counter being placed in non-add condition automatically by the carriage by connections shown in Muller No. 1,397,774, which connections will be briefly described later.

After the date and the number of the check have been printed in the starting column, the motor repeat mechanism causes the machine to continue to operate, and the carriage tabulates automatically to the "No. 2" column where the machine is given another stroke of operation. In this column, the date, the number, and the amount of the check are all printed on the journal sheet "Jan. 11 '28 1 $430 (Dollars) and 50 (Cents)", the printing mechanism being caused to repeat because the date and the amount keys remain depressed and consecutive numbers being printed again because another roller 40 keeps the consecutive numbering mechanism in the same condition as in column 1. An additional unit is not added to the consecutive numbering mechanism in "No. 2" column because the segment 33 is not restored by operation of the machine in column 1. There is still no accumulation of the amount of the check in the upper counter 916 which remains non-add as in column 1.

After the work in "No. 2" column has been completed, operations continue automatically. The carriage is returned across the machine to "No. 3" column under the control of mechanism such as described in Rinsche Patent No. 1,580,534 with improvements as shown in Trew Patent No. 1,723,668, the platen being automatically line-spaced the proper distance for the next line of printing to be in alignment with the words "dollars" and "cents" printed on the check. The machine is then operated automatically in column 3, the amount of the check in dollars ("#430" in the example illustrated) being printed before the word "dollars" that is already on the check, but the hammers of the printing mechanism associated with the date are blocked so that the date is not printed. In this column, there is no roller 40 for the consecutive numbering mechanism and, accordingly, the segment 33 is in normal position. The consecutive numbering printing mechanism is not indexed because the 610 racks are not released and no printing of the number occurs. The amount of the check in cents is not printed in this column, the printing hammers for this section being blocked by the mechanism already referred to. In this column also, the amount of the check in dollars and cents is not accumulated in the counter 916 which remains non-added.

After operations in column 3 are completed the carriage tabulates automatically to "column No. 4" where the amount of the check in cents is printed ("and 50" cents in the example illustrated). The date of the check and the amount of the check in dollars are not printed, these sections of the printing mechanism being blocked. The consecutive numbering is in normal condition, no roller 40 operates, and no printing of the number occurs. In this column, however, the amount of the check in dollars and cents is added into the counter 916.

The automatic repeat mechanism is disabled in column 4 with the result that after the carriage tabulates back to column 1 at the end of the machine operation in column 4, the machine stops. The carriage is again in its starting position ready for a second check and when it moved to this position the consecutive numbering mechanism was operated to advance said mechanism another unit, to-wit, to 2.

A second check may be written by merely entering its amount in dollars and cents on the amount keys and depressing the starting bar after which the operations above described will again automatically take place without any attention on the part of the operator. The date remains in the machine and need not be entered again. The second check will be numbered one unit higher than its predecessor and its amount will be added to the amount of the first check in the counter 916, when the carriage reaches its column 4 position.

At the end of the run of a series of checks the total of them may be obtained and printed by depressing the total key 265 in the usual manner and taking a total from the counter 916.

*Clearing mechanism*

Before operations are started it is desirable for the operator to know that the machine is clear. After the machine has been used for a series of operations such as just described the carriage will be in its starting or "No. 1" column, the consecutive numbering mechanism will contain a number, and the counter 916 may not have been cleared. This makes it necessary for the operator to manipulate the machine to clear it and, for this purpose, certain mechanism has been provided.

The operator first moves the carriage by hand to the extreme right hand position as viewed from the front of the machine, this position being the "No. 3" column as illustrated in Fig. 11. The carriage normal key 205 is then depressed which disables the carriage tabulating mechanism described in Kilpatrick Patent No. 1,152,517, September 7, 1915. The carriage then remains in its No. 3 position when the machine is operated. It will be recalled that, in the "No. 3" position of the carriage the consecutive numbering section is normally inactive, that is, even though the pinions 20 are moved into and out of engagement with the racks 610 the pinions will not be moved because none of the 610 racks are released. Also in the "No. 3" position of the carriage, the counter 916 is in "non-add" condition.

To restore the consecutive numbering pinions 20 to zero, it is necessary to rock them into engagement with their racks 610 prior to the descent of the latter so that the racks may rotate the pinions to zero. It is then necessary to move the pinions out of engagement with the racks while the pinions are in zero position and before the racks ascend so that the pinions will remain in "0" positions. In order to permit the racks 610 to descend, it is necessary to release the latches 415 but these latches are not normally released in the "No. 3" position of the carriage. They may be manually released, however, by depressing a special key 80 which rocks a detent 81 having a wire 82 connected to the bail 55. When this key is depressed the bail 55 is pulled rearwardly and the latches 415 associated with the consecutive numbering banks are moved rearwardly to release all the racks 610 of said section.

In order to rock the pinions 20 into engagement with the racks 610 before the racks descend, the control lever 30 is pulled forward to its "total" (T) position which moves the sliding yoke 26 to a position such that, when the machine is operated, the pinions 20 will be rocked into engagement with the racks at the beginning of the forward stroke of the machine and will then be rocked out of engagement again at the end of said stroke, the action being similar to taking a total.

Accordingly, with the special key 80 depressed and the lever 30 pulled forward, the machine is given a stroke of operation whereupon the racks 610 descend until the pinions 20 are rotated to zero after which the pinions are rocked out of engagement with the racks. Upon the return stroke of the machine, the racks 610 are returned to normal, and the lever 30 is returned to normal at the end of the operation under the influence of the scissors return mechanism 31. This clears the consecutive numbering mechanism, but does not restore the transfer segments associated with it because, as previously explained, when the lever 30 is in its total or sub-total position, the restoring bail is not operated. Another stroke of the machine is necessary to operate the restoring bail and such stroke may be given immediately although a special stroke is not required if the machine is subsequently operated to clear the counter 916.

Normally, the counter 916 need not be cleared at the beginning of operations because the usual finish of the preceding operation involves taking a total of the checks at the end of a series of operations which clears the counter 916. However, the operator has no way of positively knowing that a total was taken at the end of the preceding operation and it is consequently desirable for him to check the counter 916 to be sure that it is clear.

In order to do this a total must be taken from counter 916, such operation requiring that the counter be rocked into engagement with the racks 610 before they descend and out of engagement with them after they have rotated the counter pinions to zero. The machine is conditioned for the taking of this total by the depression of the usual total key 265. Under normal conditions, it is merely necessary to depress the key 265 and give the machine a stroke of operation preceded by a spacing stroke. If there has been a total in the counter this total will be printed and a character indicating that the printed amount is a total will be printed at the side of the total. If the counter is clear, only the character will be printed which serves to indicate to the operator that the counter is clear.

It is not convenient to clear the counter 916 in the position of the carriage to which it has been moved for the purpose of clearing the consecutive numbering mechanism (No. 3, position). This is due to the fact that, in this position of the carriage, the control connections for the counter 916 are in "non-add" condition. It would be necessary to disable the non-add mechanism before taking a total and, while this can be done by a special series of operations, it is more convenient to move the carriage to its next position, that is its "No. 4" columnar position which is done by manual operation of the tabulating mechanism. In the "No. 4" position of the carriage the controls for the counter 916 are normally in "addition" condition and the consecutive numbering mechanism is inactive. When the total key 265 is depressed and the machine operated with the carriage in this position, a total will be taken from the counter 916 and the counter cleared as above described. The carriage remains in its No. 4 position since the carriage normal key is still depressed.

To recapitulate, after the operator has cleared the consecutive numbering mechanism in the "No. 3" columnar position of the carriage, he moves the carriage to its "No. 4" columnar position by manual operation of the tabulating mechanism where he gives the machine a spacing stroke, depresses the total key, and operates the machine to take a total. This clears the counter 916 and incidentally restores the transfer segments of the consecutive numbering mechanism, the carriage remaining in its No. 4 position.

The machine now being clear, the carriage normal key 205 is released and the machine operated which moves the carriage to its starting or "No. 1" position where operations may begin, the movement of the carriage to this position serving to advance the consecutive numbering mechanism one unit in a manner heretofore described.

*Beginning check numbers with numbers higher than one*

It is sometimes desirable to begin numbering checks with a number higher than 1 and, in order to do this, provision must be made for charging the consecutive numbering mechanism with a given number such that, when the first check is printed, it will bear the desired number. In order to condition the machine for this purpose a special normal key N has been provided.

The normal key N (Fig. 4) is urged upward by a spring 90 connected to a key stem 91, said spring also serving to latch the key depressed by pulling rearwardly on the key stem to maintain a notch 92 in the stem over the edge of a plate 93 of the keyboard. The lower end of the key stem 91 has a heel 94 positioned to engage a stud 95 on the rearwardly extending arm 96 of the three armed lever 48. The heel 94 is normally out of the path of the stud 95 but, when the key N is depressed, the heel is moved downwardly to a position immediately above the stud 95 so as to prevent clockwise movement of the three-armed lever 48.

In order to start operations involving the numbering of checks beginning with a number higher than 1, it is necessary to clear the machine. Assume that the clearing operation has been carried forward as above described to the point where the machine is clear and the carriage is in its No. 4 position. At this point the operation differs from normal to the extent that the special key N is depressed before the carriage is moved to its No. 1 or starting position. After the special key N has been depressed the carriage may be moved to its starting position by manual operation of the tabulating mechanism or by releasing the carriage normal key 205 and operating the machine.

After the carriage reaches its starting position the carriage normal key 205 is depressed if it was released in the preceding operation so that the next operation of the machine will not tabulate the carriage.

It will be recalled that, under normal conditions, when the carriage is moved to its No. 1 or starting position, the roller 40 engages the lever 41 which pulls the link 45 rearwardly, rocks the bell crank lever 48 clockwise and operates the connections which release the segment 33 to add a unit in the consecutive numbering mechanism. This action does not occur when special key N has been depressed as above described because the heel 94 of the key stem 91 prevents clockwise movement of the three armed lever 48. When the carriage moves to No. 1 or starting position under the conditions above described, the lever 41 is rocked downwardly and the lever 44 moved clockwise but the link 45 is not pulled rearward, the spring 46 being tensioned instead. This leaves the consecutive numbering mechanism in condition so that the amount keys of this section may be utilized for charging the mechanism with a given number.

With the parts in this condition, the keys in the consecutive numbering section are depressed to enter an item which is one unit less than the desired number for the first check. If, for example, it is desired to have the first check numbered 200, 199 would be entered on the keys of the consecutive numbering section. The entry of this amount releases the latches 415 in the banks in which keys are depressed and, upon operation of the machine, the 610 racks in these banks descend to positions determined by the depressed keys. In the example given, 199 is added on the pinions 20.

The carriage normal key and the special normal key N are then released. Release of the carriage normal key enables the tabulating mechanism. Upon release of the key N, the three-armed lever 48 moves clockwise to the position to which it is normally moved by the roller 40 in the starting position of the carriage, such movement being effected by the spring 46.

This rocks the lever 51—52 counterclockwise and moves the bail 55 rearwardly, the bail acting through lever 59 and link 60 to move the detent 62 to release the segment 33 which thereupon moves to add a unit to the consecutive numbering mechanism. Inasmuch as this mechanism has already been charged with the number 199, the addition of another unit causes the mechanism to register 200. The machine is then in condition for operations to begin on the first check which will be numbered 200.

The special key N not only normalizes the consecutive numbering mechanism but it also normalizes the controls for the counter 916. In other words, when the special key N is depressed with the carriage in its starting column, the machine is placed in normal condition, that is, the consecutive numbering mechanism is inactive and the machine is in addition condition for the counter 916. The special key N may, therefore, be considered a normalizing key for the machine, depression of said key with the carriage in the starting position permitting the machine to be used for ordinary calculations on the counter 916. The fact that the depression of the normal key N also normalizes the counter 916 permits this counter to be cleared in the starting position instead of in the "No.4" position of the carriage if such action is desired. The action of the special key in normalizing the counter 916 is as follows:

The normal condition of the controls for counter 916 is "addition" condition. In the starting position of the carriage, however, the non-add mechanism is operative to place the controls in non-add condition which makes it necessary to disable the non-add mechanism if the counter controls are to be placed in normal condition.

This non-add condition is brought about by controls operated by the carriage. The carriage has a roller 110 (Fig. 1) which rocks a yoke 111 that, in turn, rocks a lever 112 clockwise, said lever being pivoted at 113. The lever carries a stud 114 which contacts a raised portion 115 on the arm 116 of an irregular shaped member pivoted at 117. This member has another arm 118 upon which a bell crank lever 119 is pivoted at 120, said bell crank lever being urged clockwise by a spring 121. The forward end of this bell crank lever contacts a stud 122 on a pawl 123 pivoted at 124 and urged clockwise by a spring 125. When the member 116—118 is rocked downwardly, the pawl 123 is rocked counter-clockwise against the tension of spring 125 to a position such that it interferes with the pass-by pawl 821 that operates the lever 913. It will be recalled that lever 913 moves pitman 914 that rocks the counter 916 into and out of engagement with the racks. As previously explained, the pass-by pawl 821 is carried by an arm 813 which is rocked counter-clockwise from the position of Fig. 1 to the position such that the pawl 821 passes the left-hand stud 961 on the member 913. Upon the return stroke of the machine the pawl engages said stud to rock the member 913 to move the counter 916 into engagement with the actuator racks. When the pawl 123 is moved counter-clockwise in the "No. 1 column" by the carriage connections described, its lower end is in a position to engage the pass-by pawl 821 so as to disable it from engaging the stud 961 upon the return stroke of the machine. Accordingly, the counter is not rocked into engagement with the racks and no addition takes place.

The stem of the normal key N carries a stud 130 adapted to engage one arm 131 of a pivoted V-shaped member whose other arm 132 engages a stud 133 on the bell crank lever 118. When the key N is depressed the stud 130 rocks the V-shaped member counterclockwise and this, in turn, rocks the bell crank lever 118 counterclockwise out of engagement with the pawl 123 whereupon the spring 126 moves the non-add pawl clockwise out of the path of the pass-by pawl 821. This prevents the passer-by pawl 821 from being disabled and places the mechanism in normal condition.

The machine described has a second means for pulling the counter 916 into engagement with the actuator racks at the end of the forward stroke in performing addition. This means comprises a link 140 (Fig. 1) having a shoulder 141 that is engaged by a stud 142 on lever 813 which is rocked counterclockwise during the forward stroke of the machine. When the machine is non-added by the carriage in the starting or No. 1 column, the arm 116, when moved down by the stud 114, on lever 112, moves the link 140 out of the path of the stud 142 and the link is inoperative to pull the counter into engagement with the racks at the end of the forward stroke.

The lever 112 which moves the arm 116 downward has a lower extension 143 to which is connected a link 144 that controls the non-add mechanism for the pinions 20 as described in application, Serial No. 123,397, filed July 19, 1926. When the lever 112 is rocked clockwise in the "No. 1 column" to non-add the counter 916, the lower end 143 of the lever moves the link 144 to one of its "non-add" positions to non-add the pinions 20. When charging the consecutive numbering mechanism with a number greater than "1" it is desired to have the pinions 20 in "addition" condition. In order to insure this and to insure that the rocking of the bell crank lever 118 by the V-shaped member 131—132 does not raise the member 116—118 and thereby move links 140 and 144, the lower end of the stem 91 of the key N is provided with an extension 145 for engaging the stud 114 to hold lever 112 down to position so that it will maintain the link 140 in position to maintain the controlling mechanism for pinions 20 in addition condition.

It is not desired to print the figures that may be in the consecutive numbering mechanism or the counter 916 during the charging operations and, in order to prevent this, the stem 91 of the normal key N is provided with a stud 150 (Fig. 150) engaging the bifurcated end of an arm 151 fixed to a shaft 152 which also has a downwardly extending arm 153 (Fig. 1) fixed to it, the latter being positioned to engage a stud 154 on the bell crank plate 155 that controls the blocking of the printing hammers. By means of these connections, depression of the key N causes the hammers to be blocked to prevent printing.

*Multiple counters*

The capacity of the machine for different kinds of work may be considerably increased by employing a plurality of counters for receiving the dollars and cents items that are set up in the machine.

These counters comprise pinions rotatably mounted upon a sleeve 160 that is slidably mounted on a shaft 161 as illustrated in Fig. 10. The pinions of each order for each of the counters are grouped together and occupy the spaces between the actuator racks 610. The pinions which are not in alignment with the actuator racks are held against rotation by an aligning plate 162 which is provided with slots 163 in alignment with the racks 610 so that the pinions that are in alignment with the racks may be rotated by said racks when the counter frame is rocked to move the pinion into operative engagement.

The sleeve 160 also carries the pinions 20 for the consecutive number counter. It will be noted that no pinions are provided on sleeve 160 in the groups at the right-hand side of the machine where the pinions for the number 1 counter would ordinarily be located. These pinions have been omitted and only those for the numbers 2, 3, 4, 5 and 6 counters are mounted on the sleeve. The normal position of the sleeve 160 is that shown in Fig. 10, in which the blank spaces for the number 1 counter are in alignment with the actuator racks 610. In this position the pinions 20 for the consecutive numbering counter are in alignment with their rack 610. When the sleeve 160 is moved to the left to align any one of the counters from 2 to 6, inclusive with the actuator racks 610, the pinions 20 are moved out of alignment with their racks 610 and are inoperative. This means that, normally, the consecutive numbering counter is in active position and none of the multiple counters from 2 to 6, inclusive are active. Accordingly, the use of the consecutive numbering counter will not change the condition of any of the multiple counters. Also, when any of the multiple counters are moved to active position, the consecutive numbering counter is inactive and hence no change takes place in the consecutive numbering section when operations are being performed with the multiple counters.

The sleeve 160 is moved laterally by means of a shaft 164 carrying an arm 165 that is connected by a universal joint to a clamp 166 on the sleeve. The shaft 164 is urged in a clockwise direction by a spring 167 connected at one end to a frame stud and at its other end to a locking sector 168 whose function will be later described. At the rear end of the shaft 164 an arm 169 is mounted carrying stud 170 against which bears one end of a lever 171 pivoted on the shaft 172. The upper end of the lever 171 is connected by a spring 173 to one arm 174 of a yoke 175 having a second arm 176 carrying a roller positioned to be engaged by a cam slide 177 on the paper carriage.

The shaft 164 is normally latched in position by a latch 180 which is urged clockwise by a spring 181 to cause the pointed end of the latch to engage the notches in the sector 168 fixed to the shaft 164. The latch is released during the forward stroke of the machine by a laterally extending sector 182 formed on the lower end of the arm 813 which is rocked at each operation of the machine. During the forward stroke of the machine, the lever 813 rocks clockwise and the sector 182 engages a pass-by pawl 183 (Fig. 10) on the latch 180 to raise the latch to release the sector 168. During the return stroke the pass-by pawl 183 yields so that the sector 182 passes the latch without changing its position.

The connections just described provide a means for automatically selecting the multiple counters under the control of the carriage. For example, if the cam 177 moves the arm 176 downwardly, pressure is brought to bear by the lever 171 on the stud 170 to rock the shaft 164 counter-clockwise against the tension of spring 167 to move the sleeve 160 to the left as viewed in Figs. 9 and 10. The carriage tabulates during the latter part of the return stroke of the machine, as the latch 180 is not released until the forward stroke of the next operation of the machine, the lever 171 cannot move the stud 170. Instead, when the cam 177 moves the arm 176 downwardly, the spring 173 yields and is tensioned. During the next forward stroke of the machine, the latch 180 is released whereupon the spring 173 rocks the shaft 164 against the tension of spring 167 to position the selected counter in alignment with the actuator racks. After the counter has been positioned, the latch 180 again moves to latching position to hold the counter in the position to which it has been moved. The sleeve 160 is moved in the reverse direction by a release of the arm 176 by the cam 177 permitting the lever 171 to move away from the stud 170 a predetermined distance. The stud 170 and the shaft 164 cannot move immediately because they are held by the latch 180 but, upon the next forward stroke of the machine, said latch is released, and the spring 167 rocks the shaft 164 until the stud 170 engages the lever 171 which determines the position of the shaft 164 and the sleeve 160.

The counters are rocked into and out of engagement with the racks 610 by the cam 23 previously described, and the controls for the counters are the same as those heretofore explained. In fact, the mechanism operates in the same way except that provision is made for a plurality of counters instead of a single counter.

These multiple counters do not interfere in any way with using the machine as heretofore described and they provide additional facilities if such are desired. For example, in the machine first described, the amounts of the checks were accumulated in the upper counter. Such counter may still be used to accumulate the amounts of the checks and, in combination with this, the multiple counters may be used to accumulate the amounts of different groups of checks. In order to do this the cam bar 177 on the carriage is adjusted so as to bring one of the multiple counters into active position in one of the columnar positions of the carriage where the consecutive numbering section is not employed. In the example of work heretofore given this could be in the number 4 column. This adjustment could be used for a predetermined period after which, if it was desired to accumulate a different group of checks in a different lower counter, the bar 177 could be adjusted to bring another counter into active position in the number 4 column of the carriage. A great variety of different kinds of work can be done because there are five counters that can be used and the carriage has a large number of columnar positions and various combinations of non-adding the different counters can be employed. If it is not considered convenient to adjust the cam bar 177 on the rear of the carriage the multiple counters may be manually selected by a mechanism such as disclosed in copending application, Serial No. 297,851, filed August 6, 1928.

It is to be understood that the structure shown is for purposes of illustration only and that variations may be made in it without departing from the spirit and scope of the invention as defined by the appended claims.

I claim:

1. The combination in a calculating machine having a printing mechanism and a traveling paper carriage, of a consecutive numbering mechanism having connections controlled by said carriage for automatically adding a unit to said numbering mechanism in a predetermined columnar position of the carriage, and means for indexing said printing mechanism by means of said consecutive numbering mechanism while leaving the indexed number in said numbering mechanism.

2. The combination in a calculating machine having a printing mechanism and a traveling paper carriage, of a consecutive numbering mechanism having connections actuated by said carriage as it moves to a predetermined columnar position for automatically adding a unit to said consecutive numbering mechanism and means for indexing said printing mechanism by means of said consecutive numbering mechanism while leaving the indexed number in said numbering mechanism.

3. The combination in a calculating machine having depressible amount keys and a traveling paper carriage, of a consecutive numbering mechanism normally under the control of connections controlled by said carriage, said connections acting to automatically add a unit to said consecutive numbering mechanism in a predetermined columnar position of the carriage, and a depressible key and connections for disabling the carriage controlled connections for said consecutive numbering mechanism and placing said numbering mechanism under control of said depressible keys.

4. The combination in a calculating machine having depressible amount keys, a printing mechanism, and a traveling paper carriage, of a consecutive numbering mechanism normally under the control of connections controlled by said carriage, said connections acting to automatically add a unit to said consecutive numbering mechanism in a predetermined columnar position of said carriage, means for indexing said printing mechanism by means of said consecutive numbering mechanism, and a depressible key and connections for disabling said printing mechanism and the carriage controlled connections for said consecutive numbering mechanism and for placing said numbering mechanism under the control of said amount keys.

5. The combination in a calculating machine having a printing mechanism and a traveling paper carriage, of a consecutive numbering mechanism, depressible amount keys and connections for charging said consecutive numbering mechanism with a given number, connections controlled by said carriage for automatically adding a unit to said numbering mechanism in a predetermined columnar position of the carriage, and means for indexing said printing mechanism by means of said consecutive numbering mechanism while leaving the indexed number in said numbering mechanism.

6. The combination in a calculating machine having a traveling paper carriage, of a consecutive numbering mechanism, a printing mechanism having devices associated with it by means of which it may be indexed by said consecutive numbering mechanism, and connections actuated by said paper carriage as said carriage moves to a predetermined columnar position for automatically adding a unit to said consecutive numbering mechanism and for automatically conditioning said devices for indexing said printing mechanism by said consecutive numbering mechanism.

7. In combination, a calculating machine having a traveling paper carriage, a counter, and means controlled by the carriage acting to automatically add a unit to said counter when the carriage reaches a predetermined columnar position.

8. In combination, a calculating machine having a traveling paper carriage, a counter, and connections controlled by said carriage acting to automatically add a unit to the lowest order of said counter when the carriage reaches a predetermined columnar position.

9. In combination, a calculating machine having a aveling paper carriage, a counter, and connections actuated by said carriage for automatically adding a unit to said counter as the carriage moves to a predetermined columnar position.

10. In combination, a calculating machine having a printing mechanism, a traveling paper carriage, a counter comprising a series of counter pinions, connections controlled by the carriage for automatically adding a unit to said counter by advancing a pinion in a predetermined order of said counter, and means controlled by the carriage for printing the number in said counter after it has been advanced said unit.

11. In combination, a calculating machine having a counter, a printing mechanism, a traveling paper carriage, means actuated by said carriage as it reaches a predetermined columnar position for adding a unit to said counter, and connections operated by said carriage for conditioning the machine to cause said printing mechanism to be indexed by the counter when the machine is operated in said columnar position.

12. In combination, a calculating machine having a printing mechanism, a traveling paper carriage, a counter, and connections controlled by said carriage in a predetermined columnar position thereof for automatically adding a unit to said counter and causing the number in said counter to be printed after said unit has been added.

13. In combination, a calculating machine having a traveling paper carriage, a printing mechanism, a counter and controls for taking a total and sub-total from said counter and printing the same, and connections controlled by said carriage in a predetermined columnar position thereof for automatically adding a unit to said counter and for conditioning said controls to take a sub-total from said counter.

14. A calculating machine having a calculating mechanism, means for operating said machine a plurality of times to effect a given series of calculations, a consecutive numbering mechanism, and means acting automatically to advance said consecutive numbering mechanism one unit for each series of calculations.

15. A calculating machine having a calculating mechanism, means for operating said machine a plurality of times to effect a given series of calculations, a consecu'ive numbering mechanism, and means acting to automatically advance said numbering mechanism one unit during one of said series of operations, said advancing means being ineffective during the other operations of the series.

16. A calculating machine having a consecutive numbering mechanism, means normally conditioned to automatically advance said consecutive numbering mechanism during an operation of the machine, manipulative devices for charging said consecutive numbering mechanism, said manipulative devices being normally disabled for control of said consecutive numbering mechanism, and conditioning means for disabling said automatic advancing means and temporarily placing said consecutive numbering mechanism under the control of said manipulative devices whereby said consecutive numbering mechanism may be charged with a given number from which said numbering mechanism may be automatically advanced after it is again placed by said conditioning means under the control of said advancing means.

17. A calculating machine having a keyboard, a consecutive numbering mechanism, means normally conditioned to automatically advance said consecutive numbering mechanism during an operation of the machine, depressible amount keys and connections on said keyboard for charging said consecutive numbering mechanism, said depressible keys and connections being normally disabled from control of said consecutive numbering mechanism, and conditioning means for disabling said automatic advancing means and temporarily placing said consecutive numbering mechanism under the control of said depressible keys whereby said numbering mechanism may be charged with a given number, said conditioning means having provisions for then disabling the control of the consecutive numbering mechanism by said amount keys and placing said control under said automatic advancing means whereby said numbering mechanism may be automatically advanced from a given number.

18. A calculating machine having a consecutive numbering mechanism, means normally advancing said consecutive numbering mechanism automatically during an operation of the machine, depressible keys and connections for charging said consecutive numbering mechanism, said depressible keys and connections being normally disabled from control of such consecutive numbering mechanism, a printing mechanism normally conditioned to print the amount in said consecutive numbering mechanism, and conditioning means for conditioning said machine to disable said automatic advancing means and said printing mechanism and temporarily place said consecutive numbering mechanism under the control of said depressible keys and connections whereby said consecutive numbering mechanism may be charged with a given number without printing said number, said conditioning means being then capable of conditioning the machine to enable said printing mechanism and place said consecutive numbering mechanism under the control of said automatically advancing means.

19. In a calculating machine having actuator racks, a multiple register support, operating means for moving said support to move the registers into and out of engagement with said actuator racks, and conditioning means for conditioning said operating means for different calculations; of a consecutive numbering mechanism mounted on said register support, means for automatically advancing said consecutive numbering mechanism during an operation of the machine, and means for positioning said register support and conditioning said operating means to cause said consecutive numbering mechanism to be placed in control of said printing mechanism through said actuator racks to print the number in said consecutive numbering mechanism.

20. In a calculating machine having actuator racks, a multiple register support, operating means for moving said support to move selected registers into and out of engagement with said actuator racks, a printing mechanism, and means for conditioning said operating means for total and subtotal taking; a consecutive numbering mechanism mounted on said register support, means acting to add to said consecutive numbering mechanism during an operation of the machine, and mechanism acting to automatically position said register support to render the registers inactive and the consecutive numbering mechanism active and to condition said total taking means for subtotal taking whereby, as the machine is operated, the number in said consecutive numbering mechanism is printed without disturbing said registers.

21. An automatic check writing and recording machine having means for receiving blank checks and a journal sheet in separated relation, differential mechanism controlled by depressible keys upon which the dates and the amounts of checks may be entered, an automatically advanced consecutive numbering mechanism, printing mechanism for printing the date, the number and the amount of each check, and automatic means acting, when the machine is set into operation after the date and the amount of a check have been entered on said keys, to cause said machine to operate and to condition and cause it to print the date, the number, and the amount of said check at predetermined places on both the blank check and the journal sheet.

22. An automatic check writing and recording machine having means for receiving blank checks and a journal sheet in separated relation, a differential mechanism controlled by depressible keys upon which the dates and the amounts of checks may be entered, an automatically advanced consecutive numbering mechanism, printing mechanism for printing the date, the number and the amount of each check, repeat means associated with the date keys to cause the date first entered on the keys to be printed on a plurality of checks without requiring a re-setting of the keys, automatic means acting, when said machine is set into operation after the entry of the amount of a check on said keys and the setting of the date keys, to cause not only the amount but also the date and the number of said check to be printed in predetermined places and on predetermined lines on both said blank check and said journal sheet.

23. An automatic check writing and recording machine having a carriage for receiving blank checks and a journal sheet in separated relation, a calculating mechanism including depressible keys upon which the dates and amounts of checks may be entered, an automatically advanced consecutive numbering mechanism, a single printing mechanism for printing the date, the number and the amount of each check, and automatic means acting, when said machine is set into operation after the entry of the date and the amount of a check on said keys, to cause the machine to operate and to condition it to print the date, the number and the amount of said check in predetermined places on both said blank check and journal sheet.

24. An automatic check writing and recording machine having means for receiving blank checks and a journal sheet in separated relation, a differential mechanism including depressible keys upon which the dates and the amounts of checks may be entered, a consecutive numbering mechanism, depressible keys and connections by means of which said consecutive numbering mechanism may be charged with a given number, means associated with said consecutive numbering mechanism for automatically adding a unit to the number in said numbering mechanism during certain operations of the machine, and automatic means acting, when said machine is set into operation after the date and the amount of a check have been entered on said keys, to cause said machine to operate and to condition it to cause it to print the date, the number and the amount of said check in predetermined places on both said blank check and said journal sheet.

25. An automatic check writing and recording machine having a traveling paper carriage for receiving blank checks and a journal sheet, a differential mechanism including depressible keys upon which the dates and the amounts of checks may be entered, a consecutive numbering mechanism, a printing mechanism, and means acting, when said machine is set into operation after the date and the amount of a check have been entered on said keys, to automatically cause said machine to continue to operate and to tabulate said carriage to different positions to print the date, the number, and the amount of said check in predetermined positions and on predetermined lines of said blank check and said journal sheet, and connections controlled by said carriage for advancing said consecutive numbering mechanism one unit as said carriage is returned to its normal position after having performed said operations.

26. An automatic check writing and recording machine having a traveling carriage for receiving a strip of blank checks and a journal sheet side by side, differential mechanism controlled by depressible keys, said keys and differential mechanism being divided into a date and an amount section, a consecutive numbering mechanism, a subdivided printing mechanism having individual sections controlled respectively by the date and the amount sections of the differential mechanism and by the consecutive numbering mechanism, automatic means acting when the machine is set into operation after the date and amount of a check have been entered on the depressible keys, to cause the machine to go through a cycle of operations including tabulation and line spacing of the carriage to different positions to present different portions of the check and the journal sheet to said printing mechanism, connections controlled by the carriage or automatically conditioning the machine during said cycle of operations to print the date, the number, and the amount of said check in a single line on the journal sheet, and at predetermined places on different lines of said blank check, and means for automatically advancing the consecutive numbering mechanism a unit after each series of operations.

27. An automatic check writing and recording machine having means for receiving blank checks and a journal sheet in separate relation, a calculating mechanism including depressible keys upon which the dates and amounts of checks may be entered, an automatically advanced consecutive numbering mechanism, a printing mechanism for printing the date, the number and the amount of each check, automatic means acting, when said machine is set into operation after the entry of the date and the amount of the check on said machine, to cause the machine to operate and to condition it to print the date, the number, and the amount of each check in predetermined places on both said check and journal sheet, said calculating mechanism having portions acting to accumulate the amount of said checks, and means for conditioning said printing mechanism to print said accumulated amount.

28. An automatic check writing and recording machine having means for receiving blank checks and a journal sheet in separated relation, a calculating mechanism including depressible keys upon which the dates and amounts of checks may be entered, an automatically advanced consecutive numbering mechanism, a printing mechanism for printing the date, the number and the amount of each check, automatic means acting, when said machine is set into operation after the entry of the date and the amount of a check on said keys, to cause the machine to operate and to condition it to print the date, the number and the amount of each check in predetermined places on both said blank check and journal sheet, said calculating mechanism having portions acting to selectively accumulate the amounts of the checks, and means for conditioning said printing mechanism to selectively print said accumulated amounts.

29. A calculating machine of the class described having calculating mechanism, a traveling paper carriage mounted to move from column to column across said machine, a counting mechanism adapted to be advanced step by step, advancing means for advancing said counting mechanism step by step, said advancing mechanism being normally conditioned so that it will not advance said numbering mechanism, and means controlled by said paper carriage acting automatically to condition said advancing means to cause it to advance said numbering mechanism in a predetermined columnar position of said carriage.

30. A calculating machine of the class described having calculating mechanism, a traveling paper carriage mounted to move from column to column across said machine, a counting mechanism adapted to be advanced step by step, advancing means for advancing said counting mechanism step by step, latching means normally restraining said advancing means against operation of said counting mechanism, and means controlled by said carriage acting to automatically release said latching means in a predetermined columnar position of said carriage.

ROBERT L. MULLER.